United States Patent [19]

Nagayama

[11] Patent Number: 5,238,344
[45] Date of Patent: Aug. 24, 1993

[54] TEE NUT

[76] Inventor: Yutaka Nagayama, 358-132 Kanmatsu-cho, Kishiwada-shi, Osaka, Japan

[21] Appl. No.: 809,766

[22] Filed: Dec. 18, 1991

[30] Foreign Application Priority Data

May 16, 1991 [JP] Japan .................. 3-111468

[51] Int. Cl.⁵ .............................. F16B 37/04
[52] U.S. Cl. .................. 411/183; 411/181; 411/113
[58] Field of Search ........... 411/112, 113, 177, 179, 411/180, 181, 183, 427, 436

[56] References Cited

U.S. PATENT DOCUMENTS

| | | | |
|---|---|---|---|
| 945,737 | 1/1910 | Anderson | 411/177 |
| 1,112,525 | 10/1914 | Darling | 411/181 |
| 1,873,894 | 8/1932 | Kimbell | 411/177 |
| 2,102,558 | 12/1937 | Johnson | 411/177 |
| 3,125,146 | 3/1964 | Rosan | 411/181 |
| 3,208,135 | 9/1965 | Newbold et al. | 411/179 |
| 3,281,171 | 10/1966 | Hughes | 411/179 |
| 3,358,727 | 12/1967 | Hughes | 411/177 |
| 3,910,331 | 10/1975 | Randall | 411/181 |
| 4,911,592 | 3/1990 | Muller | 411/181 |

*Primary Examiner*—Neill R. Wilson

[57] ABSTRACT

A tee nut has a stem portion and a flange portion which are integrally made by sheet metal processing using an iron sheet. The stem portion has a crimping portion at an end opposite to the flange portion. The inner peripheral surface excluding the crimping portion is formed with a female thread. The flange portion is provided with a plurality of pawls formed by radially inwardly deforming part of the outer peripheral edge of the flange portion from the outside. The pawls inhibit rotation of the nut relative to an object to which the nut is secured. The pawls can be driven into the object concurrently with the crimping applied to the crimping portion. A radially outwardly open notch is formed in each pawl simultaneously with the deformation of the pawls.

5 Claims, 2 Drawing Sheets

TEE NUT

FIELD OF THE INVENTION

This invention relates to a tee nut and particularly it relates to a tee nut comprising a hollow stem portion formed on its inner peripheral surface with a female thread, and a flange outwardly extending from one end of said stem portion and having a plurality of pawls formed thereon.

BACKGROUND INFORMATION

FIG. 4 shows a conventional tee nut 1 comprises a stem portion 2 and a flange portion 3 extending outwardly from a first end of the stem portion 2, said portions being integrally made of metal. The stem portion 2 is in the form of a hollow cylindrical body, having a crimping portion 4 at a second end opposite to the first end, and the inner surface excluding said crimping portion 4 is formed with a female thread (not shown). The outer peripheral edge of the flange portion 3 is formed with four equispaced pawls 5 projecting toward the second end of the stem portion 2. The pawls 5 are formed by cutting part of the flange portion to provide tongue pieces and raising said tongue pieces in a predetermined direction.

Such tee nut is secured to an object to be fixed, such as wood, by inserting its stem portion 2 into a through-hole first formed in said object, and crimping the free end by spreading the crimping portion 4 at the surface opposite to the surface of the object on which the flange portion 3 is positioned. When the tee nut 1 has been fixed to the object, rotation of the tee nut 1 is prevented by the pawls 5 and a member such as a bolt may be threadedly engaged with the female thread formed on the inner peripheral surface of the stem portion 2.

For effecting said crimping efficiently, it is preferable to use a crimping machine and feed tee nuts successively and automatically to said crimping machine. However, in the case of the tee nut 1 shown in FIG. 4, since its pawls 5 are relatively long, they tend to be caught in the tee nut feed path. To make it possible to feed these tee nuts automatically in spite of their tendency to get jammed, a special arrangement will be required.

Further, the tee nut 1 shown in FIG. 4 should be crimped at the crimping portion 4 after the step of driving the pawls 5 into the object to be fixed is completed. Therefore, a relatively long period of operation time is expended for fixing the tee nut 1 in a piece of wood

SUMMARY OF THE INVENTION

Accordingly, an object of the invention is to provide a tee nut which can be automatically fed by a conventional crimping machine and which can be efficiently fixed to an object to be secured.

A tee nut according to this invention is characterized in that it comprises a stem portion and a flange portion extending outwardly from a first end of said stem portion, said portions being integrally made of metal, said stem portion being in the form of a hollow cylindrical body and having a crimping end at a second end opposite to the first end, the inner peripheral surface excluding said crimping end being formed with a female thread, said flange portion being provided with a plurality of pawls projecting toward the crimping end of said stem portion, said pawls being formed by radially inwardly deforming part of the outer peripheral edge of the flange portion from the outside.

In this invention, since the plurality of pawls formed on the flange portion by a radially being inwardly extending deformation from the outside, the degree of projection thereof is not so great and hence the pawls never interfere with automatic feeding.

Further, in spite of the fact that these pawls are relatively short in length, they are sufficient to prevent rotation of the tee nut with respect to the object in which the tee nut is fixed and the intrinsic function of the pawls is maintained.

Therefore, according to this invention, crimping can be effected while automatically feeding tee nuts by using a common crimping machine such as a machine on the market which effects riveting. Further, since the operation of driving the pawls into an object to be secured and the operation of crimping the crimping end portion can be concurrently effected, the fixing of the tee nut to the object can be efficiently performed.

Further, since the pawls are formed by radially inwardly deforming part of the outer peripheral edge of the flange portion, from the outside, it is only necessary to apply pressure for forming the pawls without any cutting; thus, the processing cost can be decreased as compared to tee nuts requiring a cutting and raising operation as is conventional.

Further, since the tee nut according to this invention can be obtained by performing sheet metal processing using a metal sheet as a raw material, special processing, such as cold forging, is not required, resulting in a reduced manufacturing cost and less metal fatigue; therefore, in the crimping operation, for example, there is no possibility of an undesirable cracking of the nut.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 4:
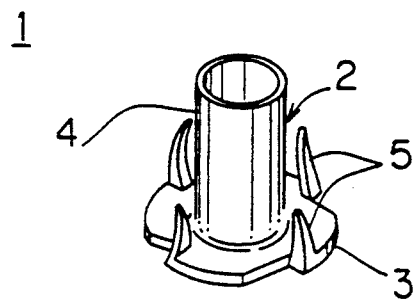
FIG. 4 is a perspective view showing a conventional tee nut.

The present tee nut 11 is made as a unit by performing sheet metal processing using an iron sheet, for example. The nut 11 comprises a stem portion 12 and a flange portion 13 extending outwardly from a first end of the stem portion 12. The stem portion 12 forms a hollow cylindrical body, as in the case of the conventional tee nut 1 shown in FIG. 4, and has a crimping portion 14 at a second end opposite to the first end. The inner peripheral surface excluding the crimping portion 14, is formed with a female thread 15. The crimping portion 14 is preferably made a wall thinner than the wall of the portion formed with the female thread 15. Thus, the female thread 15 can be cut from the first end of the stem portion 12 or from the second end, as desired.

Figure 1:
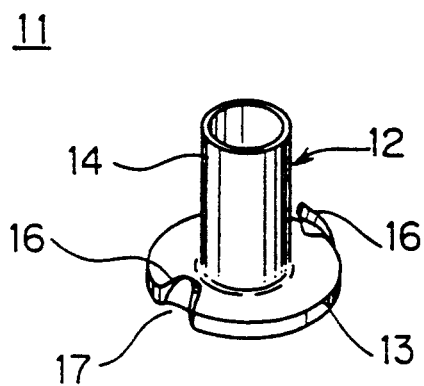
FIG. 1 is a perspective view showing a tee nut according to an embodiment of this invention.
Figure 2:
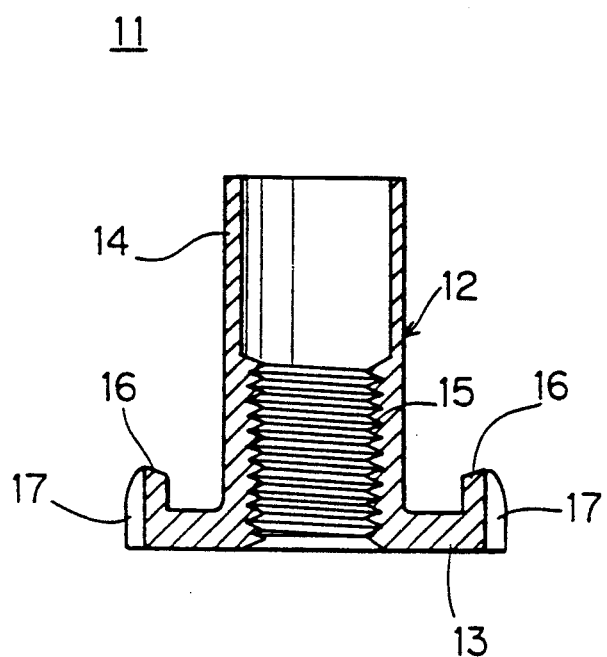
FIG. 2 is a longitudinal sectional view of the tee nut shown in FIG. 1.

The flange portion 13 is provided with a plurality of or e.g., two pawls 16 angularly spaced 180 degrees apart from each other and projecting toward the second end of the stem portion 12, said pawls being formed by radially inwardly deforming the outer peripheral edge of the flange portion 13 from outside. The pawls 16, when formed in this manner, can be easily given pointed free ends. The formation of the pawls 16 on the outer peripheral edge of the flange portion 13 results in substantially semicircular notches 17 in the pawls 16 formed simultaneously with the pawls 16 without any cutting. As seen in FIG. 1, the notches 17 are open radially outwardly.

Figure 3:
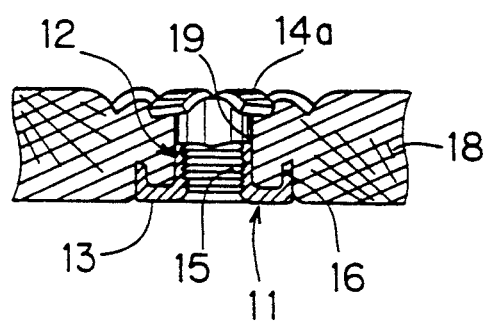
FIG. 3 is a sectional view showing how the tee nut shown in FIGS. 1 and 2 is secured in a piece of wood.

Such tee nut 11 is used, for example, in the manner shown in FIG. 3. Referring to FIG. 3, a piece of wood 18, for example, to be secured has a through-hole 19 formed therein. Then the stem portion 12 of the tee nut 11 is first inserted into this through-hole 19. In this state, a crimping machine applies a crimping force to the crimping portion 14 to thereby form a crimped portion 14a on one side of the piece 18. Concurrently therewith, the pawls 16 are driven into the other side. In this manner, the fixing of the tee nut 11 to the piece 18 is completed whereby wood enters into the notches 17.

In such an attached state of the tee nut 11, rotation of nut relative to the piece 18 is inhibited by the pawls 16 and by the notches 17, whereby the piece 18 is held between the flange portion 13 and the crimped portion 14a and the tee nut 11 is firmly fixed to the piece 18.

Although the present invention has been described and illustrated in detail, it is clearly understood that the same is by way of illustration and example only and is not to be taken by way of limitation, the scope of the present invention being limited only by the terms of the appended claims.

What is claimed is:

1. A tee nut comprising: a stem portion and a flange portion extending outwardly from a first end of said stem portion, said portions being integrally made of metal, said stem portion comprising a hollow cylindrical body having a crimping end opposite to said first end, said cylindrical body having an inner peripheral surface outside said crimping end provided with a female thread, said flange portion comprising a plurality of pawls (16) projecting toward said crimping end of said stem portion, said pawls being formed by radially inwardly deforming part of an outer peripheral edge of said flange portion, said pawls (16) comprising radially outwardly facing open notches (17) formed simultaneously with said pawls and in said pawls for an improved anchoring.

2. The tee nut of claim 1, wherein said pawls comprise pointed free ends.

3. The tee nut of claim 1, wherein said pawls are angularly equispaced 180 degrees apart from each along an outer peripheral edge of said flange portion.

4. The tee nut of claim 1, wherein said cylindrical body has a thinner wall at said crimping end than at its portion formed with said female thread.

5. The tee nut of claim 1, wherein said radially outwardly open notches (17) have a semicircular cross-section.

* * * * *